Dec. 17, 1929.                F. L. JOHNSON                    1,740,245
                              COLLAPSIBLE CORE
                            Filed Jan. 8, 1926              2 Sheets-Sheet 1
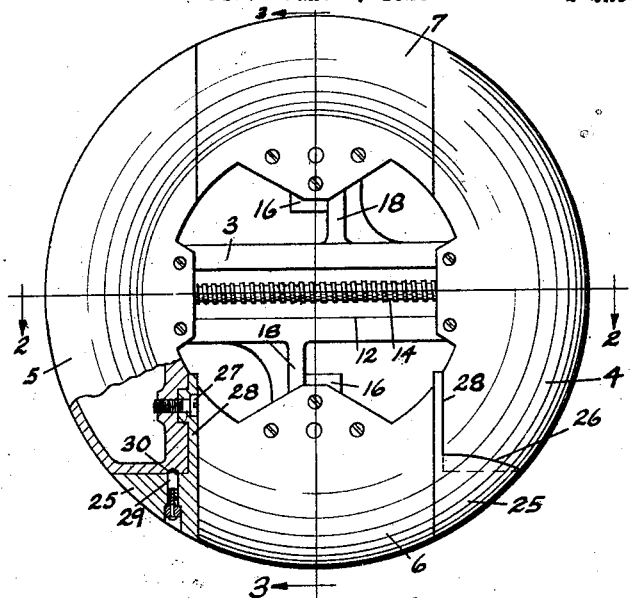
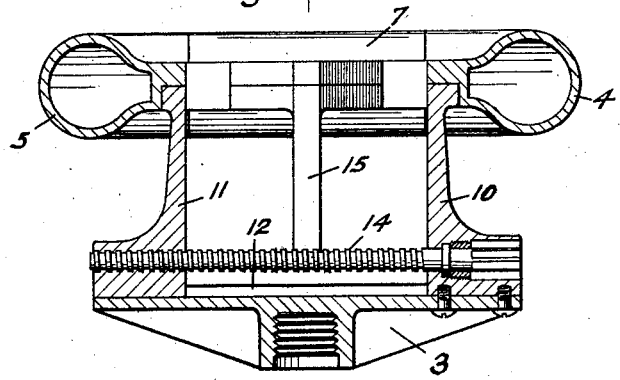
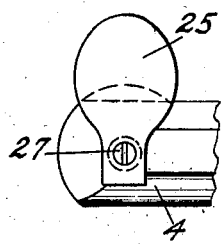
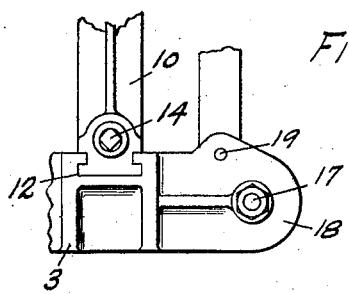
INVENTOR.
FRANK L. JOHNSON.
BY 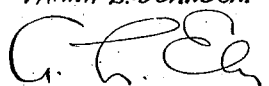
ATTORNEY.

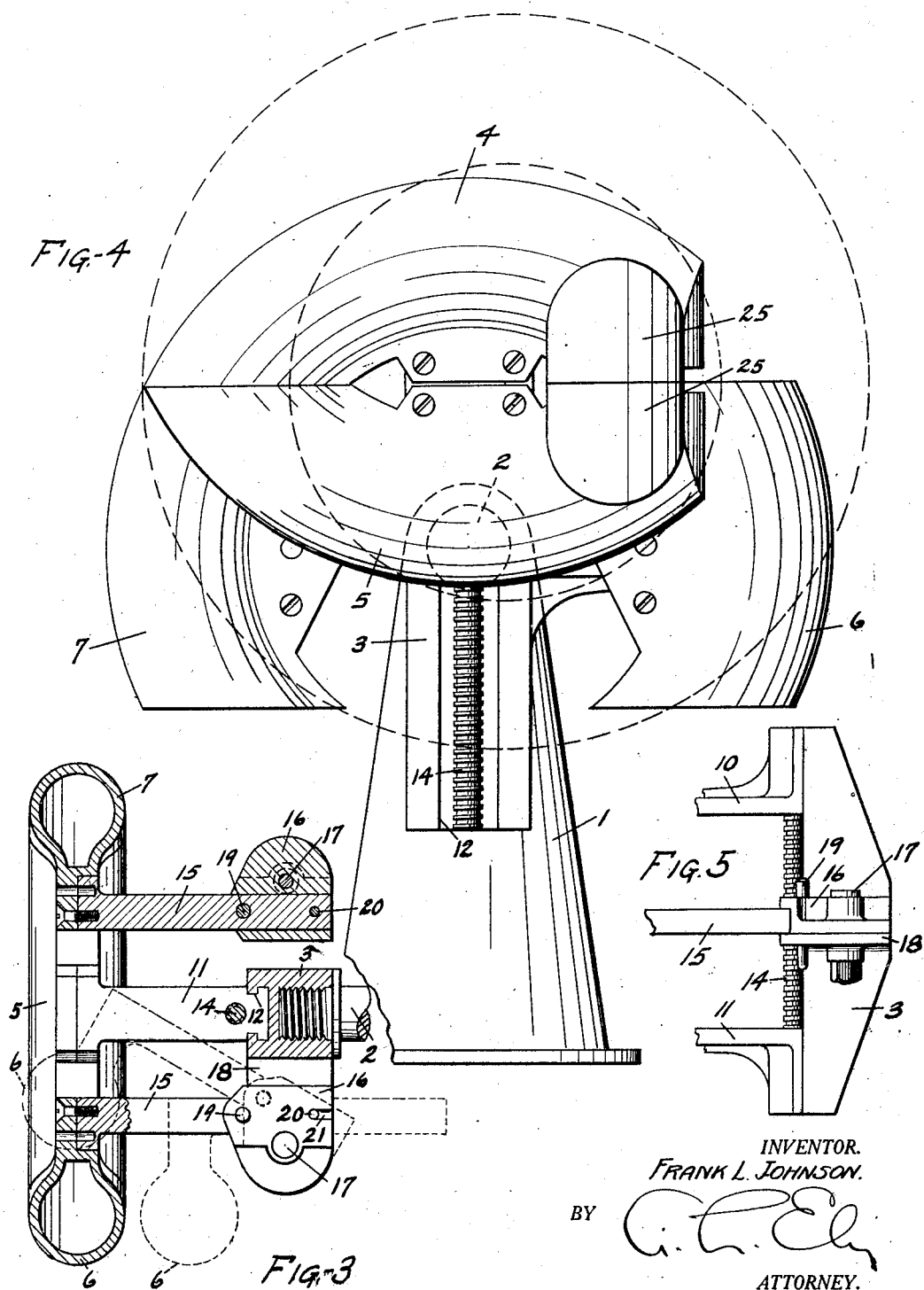

Patented Dec. 17, 1929

1,740,245

UNITED STATES PATENT OFFICE

FRANK L. JOHNSON, OF AKRON, OHIO

COLLAPSIBLE CORE

Application filed January 8, 1926. Serial No. 79,993.

This invention relates to collapsible cores for use in the building of pneumatic tires, such cores being provided with mechanism to collapse the core for removal from the completed tire casing and for reassembling the core in its complete annular condition.

Cores of this general type are well known in the art and the present invention is designed to improve upon such existing types of cores to secure certain new and useful results as will be evident from the description and drawings forming a part hereof.

The particular object of the invention is to devise a new and improved form of core which is particularly adaptable for the building of tires of very large cross section and small internal or bead diameter. On account of the great bulk of the core sections, it has been impossible heretofore to make a successful core which will strip easily and efficiently, the area within which the core sections must be collapsed being so small in comparison with the bulk of the sections as to make the designing of collapsible cores for this purpose particularly difficult.

The core shown and described herein will operate successfully in the building of large truck or bus tires, the core shown in the accompanying drawings being laid out for a 36 × 8 tire, which, as will be observed, has a bead diameter of twenty inches. Now it is an extremely difficult mechanical operation to design a form of collapsing mechanism which will permit the successful operation of this size of core, but the mechanism shown herein will operate successfully on this size of tire for reasons which will be apparent from the description and drawing illustrating the preferred embodiment of the invention.

It will be understood that the invention is not limited to exact conformity with the details set forth herein, but may be varied and modified within the scope of the invention and the claims appended hereto.

In the drawings:

Figure 1 is a view showing the core in assembled or circular condition, a portion of the core being broken away to show the internal structure of the device;

Figure 2 is a section on the line 2—2 of Figure 1;

Figure 3 is a section on the line 3—3 of Figure 1;

Figure 4 is a view in front elevation of a core in collapsed position mounted upon a stand;

Figure 5 is a detail of the base of the core;

Figure 6 is a further detail; and

Figure 7 is a view showing a detail of the small swinging tail piece upon certain of the core sections.

The core shown herein is designed and intended to be mounted upon a tire building machine or tire stand which is illustrated, for example, at 1 (Figure 4). The stand supports a core shaft 2 which may be rotated by power if desired as is usual in all forms of tire building machines. Upon the end of the shaft is mounted the main supporting plate for the core which is designated by the numeral 3, the plate being secured to the shaft by being secured to the free end of the shaft.

The core is divided into any suitable number of sections or segments, preferably four as shown herein, these sections being designated as 4, 5, 6 and 7 respectively, the sections 4 and 5 being the larger or major sections and being located oppositely to one another, and the sections 6 and 7 being designated as key sections and being located between the major sections.

The section 4 is preferably a stationary section, being secured to the plate 3 by a bracket 10 which is bolted to the core section and the plate as shown, the core section being spaced for a distance sufficient to permit the inward movement of the key section in the collapsing of the core as will be explained.

The section 5, located opposite the section 4 is movable toward and from that section by any suitable means, the form of the invention shown herein employing a bracket 11 which has fixed to its outer end the section 5 and is slidably mounted at its inner end in a guideway 12 formed in the face of the core plate 3. The core sections 4 and 5 are carried to approach or recede from one another by a feed screw 14 which is rotatably mounted in the bracket 10 and has threaded engagement with the base of the bracket 11. It is obvious that the particular method of moving the sections 4 and 5 is optional and other means may be substituted for the exact arrangement shown. It will be noted, however, that the provision of the brackets 10 and 11 outstanding from the core plate gives a free and unobstructed area at the center of the core for the withdrawal of all of the sections.

The key sections 6 and 7 are mounted upon swinging and sliding arms and are independent of one another so that each section may be swung inwardly, then into the space at the center of the core, then moved inwardly toward the core plate and dropped downwardly out of the way, the several portions of the section 6, for example, being shown in Figure 3. As the mounts of both sections are similar, one only will be described.

Each section 6 or 7 is rigidly secured to the outer end of an arm 15 which is slidably mounted in a housing 16 which is in turn pivotally mounted upon a pin 17, mounted in a bracket 18 rigid with the plate 3 and extending laterally therefrom. The housing 16 and the arm 15 are secured in their correct outward position by a removable pin 19 which passes through the housing, the arm and the bracket 18. A small pin 20, entering the slot 21 at the rear of the housing 16 accurately positions the core section.

In order to move the sections 6 or 7 from their position in the complete core, it is necessary to simply remove the pin 19, whereupon the section 6 can be first rocked outwardly about the pin 17 as a center, and then moved inwardly toward the core plate by sliding the arm 15 in the housing. When the section has been moved inwardly to clear the tire, it may be dropped down to the position shown in Figure 3. After one key section has been so moved, the other key section may be moved in the same manner. The open space within the center of the core permits of the movement of key sections of very large bulk in the manner shown and described.

When the core is collapsed, the ends or tips of the larger sections 4 and 5 frequently project to such an extent that they interfere with the removal of the tire. To overcome this difficulty and secure a more complete collapse of the core sections, the present construction includes the provision of short sections at the ends of the sections 4 and 5 which are movable upon the last named sections. These sections are designated by the numerals 25, and are cut away from the main core sections along curved surfaces 26, the axes of which are found at pivot pins 27, these pins passing into the sections 4 and 5 through inwardly extending flanges 28. In order to temporarily secure the sections 25 in proper position with respect to the sections 4 and 5 while the core is in circular condition, small spring catches 29 are mounted in the sections 25 and project into shallow sockets 30 in the adjacent faces of the larger sections. The sections 4 and 5 with their supplementary sections 25 may be said to constitute composite sections.

When the core is completely collapsed, it is in the position shown in Figure 4, the key sections 6 and 7 having been withdrawn and the sections 4 and 5 drawn together. The supplementary or small swinging sections are moved inwardly about the pivots 27 as the tire is removed. When the core is to be restored to circular condition, the process is reversed. When the sections 4 and 5 are expanded by the screw 14, it is advisable to have them expand slightly beyond their final condition so that the sections 6 and 7 can enter freely. The sections 4 and 5 may then be drawn up tightly.

It will be observed that the core design shown is particularly adapted for the manufacture of very large tires and the very bulky sections are easily handled because of the fact that the center of the core is entirely free and open. The independent mounting of the key sections permits each to be withdrawn and displaced rearwardly of the core separately which is a substantial advantage in handling the large sections. The small supplementary or pivoted end sections 25 secure a still greater stripping ability.

What is claimed is:

1. In a collapsible core construction, a pair of key sections placed opposite to one another and a pair of intermediate sections, an arm attached to each section, and a supporting plate located at one side of the core, the arms for the key sections being pivotally and slidably mounted upon said plate and an arm for an intermediate section being slidably mounted upon the core plate.

2. In a collapsible core construction, a key section, an arm rigidly attached to the key section and projecting laterally at an angle to the plane of the core, a support located at the side of the core, a housing pivoted upon the support, and a guideway in the housing in which the arm is slidable.

3. In a collapsible core construction, two oppositely positioned key sections, an arm rigidly attached to each key section and projecting laterally at an angle to the plane of the core, a support located at the side of the core, housings pivoted upon the support, and a guideway in each housing in which an arm is slidable.

4. A collapsible core comprising a plurality of sections, an arm connected to each section, a support, the arms extending from said support laterally, certain of said arms being movable about centers located on the support, and another arm with its section being movable in a straight line toward and from the remaining section.

5. A collapsible core comprising a plurality of sections, a supporting plate located at one side of the core, a pair of arms movable about pivots located upon the plate, the outer ends of said arms being connected to oppositely positioned core sections, a guideway in the plate, and an arm in the guideway, one of the remaining sections being fastened to said arm.

6. In a collapsible core, a plurality of core sections, a supporting plate located at one side of the core, a pivot at the supporting plate, a housing mounted upon the pivot, a guideway in the housing, and an arm slidably mounted in the guideway, one of said core sections being carried upon the free end of the arm, the supporting plate being spaced from the original core plane a distance greater than the transverse thickness of the section to permit the placement of the section between the plate and the core.

7. In a collapsible core, a supporting plate located at one side of the core, a guideway formed on the plate outside the plane of the core, a core section, and an arm rigidly connected to the core section at one end and movable at an angle to the plane of the core in the guideway at the other end.

8. A sectional collapsible core, a supporting plate for the core parallel to the plane of the core but located at one side thereof, parallel arms carried by the plate, each arm being connected at its outer end to one section of the core, the center of the core being unobstructed, and means to permit the movement of certain of the core sections through the center of the core to a position between the original core plane and the plate.

9. A collapsible core construction having a key section, an arm rigidly attached to the key section and projecting laterally from the core plane, a housing pivotally mounted at the side of the core, and a guideway, non-radial to the core, formed in the housing through which the arm is movable.

10. In a collapsible core, a composite section subdivided into a main and a small supplementary section forming a tip of the section, the supplementary section being so pivoted to the main section upon a pivot located within the body of the composite section that it may swing outwardly of the core plane.

11. In a collapsible core, a section subdivided into a main and supplementary section, the supplementary section being divided from the main section by an angular cut, one portion of the supplementary section forming the tip of the main section and a pivot passing through the other portion of the supplementary section and into the main section, whereby the supplementary section may swing out of the core plane.

12. In a collapsible core, a plurality of sections constituting the complete core, a single supporting plate at the side of the core and spaced a sufficient distance therefrom to permit the placement of a section between the core and the plate, a plurality of arms carried by said plate, each arm being attached to a core section, whereby the center of the core is free and unobstructed, and means to permit the movement of a section together with its supporting arm in a radial direction into the center of the core and in a lateral direction to position the section between the core and the supporting plate.

13. In a collapsible core, a section which is subdivided into a main section and a small, supplementary section forming a tip of the main section, and a pivotal connection between the main section and the supplementary section consisting of a single pivot parallel to the radius of the core about which the supplementary section will move in a fixed arc in a plane at right angles to the plane of the core.

FRANK L. JOHNSON.